United States Patent [19]
Kelley et al.

[11] Patent Number: 6,081,861
[45] Date of Patent: Jun. 27, 2000

[54] PCI MIGRATION SUPPORT OF ISA ADAPTERS

[75] Inventors: Richard Allen Kelley, Apex, N.C.; Danny Marvin Neal, Round Rock, Tex.

[73] Assignee: International Business Machines Corporation, Armonk, N.Y.

[21] Appl. No.: 09/094,712

[22] Filed: Jun. 15, 1998

[51] Int. Cl.[7] .............. G06F 13/38; G06F 13/40; G06F 13/24

[52] U.S. Cl. .............. 710/126; 710/102; 710/129; 710/260; 710/2; 710/8; 710/62

[58] Field of Search .............. 710/1–3, 8–19, 710/62, 100–104, 260–269, 126–130

[56] References Cited

U.S. PATENT DOCUMENTS

| | | | |
|---|---|---|---|
| 5,392,407 | 2/1995 | Heil et al. | 395/325 |
| 5,440,755 | 8/1995 | Harwer et al. | 395/800 |
| 5,471,590 | 11/1995 | Melo et al. | 395/288 |
| 5,502,824 | 3/1996 | Heil | 395/293 |
| 5,506,997 | 4/1996 | Maguire et al. | 395/800 |
| 5,535,420 | 7/1996 | Kardach et al. | 710/48 |
| 5,557,757 | 9/1996 | Gephardt et al. | 395/306 |
| 5,574,864 | 11/1996 | Emerson et al. | 395/280 |
| 5,596,756 | 1/1997 | O'Brien | 395/750 |
| 5,608,884 | 3/1997 | Potter | 395/309 |
| 5,619,703 | 4/1997 | Omid et al. | 710/261 |
| 5,708,813 | 1/1998 | Cho et al. | 710/260 |
| 5,721,931 | 2/1998 | Gephardt et al. | 710/260 |
| 5,752,043 | 5/1998 | Suzuki | 710/264 |
| 5,768,612 | 6/1998 | Nelson | 712/32 |
| 5,819,096 | 10/1998 | Nelson et al. | 710/260 |
| 5,857,090 | 1/1999 | Davis et al. | 395/500 |
| 5,881,294 | 3/1999 | Downey et al. | 710/260 |
| 5,918,028 | 6/1999 | Silverthorn et al. | 710/129 |

*Primary Examiner*—Ayaz R. Sheikh
*Assistant Examiner*—Sumati Lefkowitz
*Attorney, Agent, or Firm*—Robert V. Wilder; Mark E. McBurney

[57] ABSTRACT

A method and implementing system are provided which includes a PCI host bridge connected to a PCI bus. The PCI slots are applied to a switch array which is controlled by circuitry within the PCI host bridge in the example. The switch array is connected to interrupt control logic which is, in turn, coupled to the PCI host bridge. The methodology in one example uses the Interrupt Pin field in the PCI configuration space currently supported by the PCI Specification to identify an ISA interrupt signal line to which a migrated ISA device needs to be connected. Migrated ISA devices in PCI card connectors are then identified by determining the interrupt information associated with the ISA interrupt signal line identification method used. An interrupt switch array is then used to connect the migrated ISA device interrupt to the desired IRQx signal line and to the interrupt control logic. The switching array provides for a translation of PCI to ISA interrupts for connection to an interrupt controller.

17 Claims, 4 Drawing Sheets

PCI MIGRATION SUPPORT OF ISA ADAPTERS

FIELD OF THE INVENTION

The present invention relates generally to information processing systems and more particularly to systems for supporting ISA adapters in PCI systems.

BACKGROUND OF THE INVENTION

As computer systems evolved from ISA (Industry Standard Architecture) systems to PCI (Peripheral Component Interconnect) systems, new adapters and plug-in devices have been provided to the PCI standard. However, accommodation still had to be made for existing ISA systems with ISA adapters. Currently, the migration path to utilize ISA adapters in PCI systems is to provide a PCI-to-ISA bridge and to thus provide ISA slots for selective connection to ISA devices (also herein referred to as "cards" or "adapters"). This procedure is cumbersome for the PCI system in that this new PCI-ISA bridge must be supported, there are PCI-to-ISA bridge configuration restrictions that affect the system and the ISA slots must be provided.

Thus there is a need for an improved system and methodology which is effective to provide an enhanced migration path so that the function in ISA devices can be migrated to the PCI bus, essentially making them PCI devices without requiring a re-write of the device drivers.

SUMMARY OF THE INVENTION

A method and apparatus is provided which uses a predetermined identification process to identify an ISA interrupt signal line to which a migrated ISA device needs to be connected. Migrated ISA devices in PCI card connectors are then identified by determining the interrupt information associated with the ISA interrupt signal line identification method used. An interrupt switch array is then used to connect the migrated ISA device interrupt to the desired IRQx signal line and to the interrupt control logic.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

Figure 1:
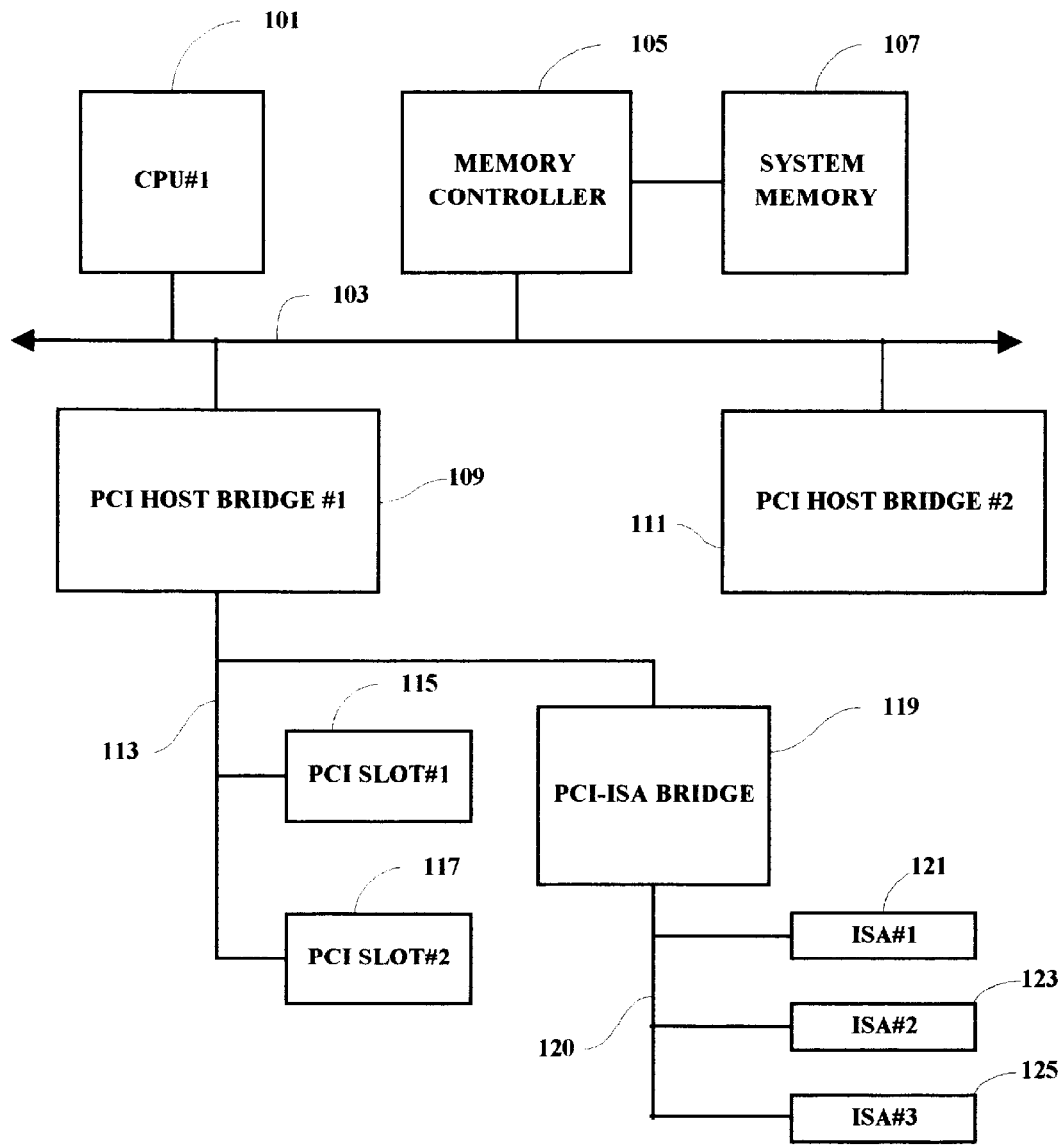
FIG. 1 is a schematic block diagram of a portion of a prior art computer system interrupt arrangement.

The ISA bus currently supports eleven separate ISA interrupt signals. Those eleven signals are typically connected directly to an interrupt controller and are designated "IRQ3–IRQ7", "IRQ9–IRQ12", and "IRQ14–IRQ15". ISA devices do not support sharing of the interrupt signals with other devices. ISA software is written to support the device on only the one interrupt signal commonly used for each device. For example, device software drivers expect the following ISA computer system devices to be connected to the associated "interrupt signal" or IRQ line: alternate serial port to IRQ3; primary serial port to IRQ4; diskette to IRQ6; parallel port to IRQ7; mouse pointing device to IRQ12; and hard drive to IRQ15. The PCI bus, however, supports four interrupt signals (INTA#, INTB#, INTC# and INTD#), and interrupt sharing is required. The four PCI interrupts can be connected to any of the interrupt controller signals and are allowed to be connected to different interrupt controller signals from one system to the next.

The current VESA (Video Electronics Standards Association) solution is to require the use of a reserved signal on the PCI bus connector and serialize the eleven ISA interrupt signals on to the reserved PCI bus signal. Additional logic on the system board would de-serialize the interrupt signals and activate the appropriate interrupt controller signals (IRQ3–IRQ7, IRQ9–IRQ12, and IRQ14–IRQ15). Use of the reserved signal on the PCI bus presents a problem, however, and the use of the "reserved signal" technique has not yet been approved.

VESA has also defined a method of performing address translation between the current hardwired ISA addresses and the dynamically assigned PCI addresses. The translation mechanism is adequate and does not require reserved PCI bus pins and therefore is a more acceptable solution.

A part of the migration is to replace the ISA bus interface on the ISA device with a PCI bus interface design. The present disclosure provides an alternate methodology of supporting the desired ISA interrupt when the device is migrated from the ISA bus to the PCI bus. Requiring the migrated ISA device to use a different interrupt signal would make it incompatible with all of the existing ISA device support software and would result in an unacceptable expense to rewrite the ISA device software and make it available on the systems that would need it.

Many current PC systems contain a PCI bus and an ISA bus. The ISA cards plugged into the ISA slots or connectors in the present example, continue to use the ISA "IRQ" interrupt signals which are compatible with the device software. In that type of system, the PCI card interrupt signals are connected to the interrupt controller through a switch array. System software determines which IRQx signals are used by the ISA cards currently plugged into the system. The system software then uses the switch array to connect the PCI interrupts (INTA#–INTD#) to the IRQx signals which are not used by the ISA devices.

The present solution eliminates the use of the reserved PCI bus signal and, instead, uses an interrupt switch array to connect the ISA interrupt to the desired IRQx signal. The ISA interrupt will be connected to one of the available PCI interrupts (INTA#–INTD#) when migrated to PCI. The PCI interrupt signal (INTx) that the ISA interrupt is connected to, will be indicated by the Interrupt Pin field in the PCI configuration space currently supported by the PCI Specification.

One of several methods of indicating to software which IRQx signal the migrated ISA device needs to be connected to is use a VPD (Vital Product Data) keyword reserved for device specific information. Another method would be to define a specific VPD keyword and add it to the current PCI specification. Other methods include the use of a specific device class code, or to define a new Header Type and use the interrupt line field in PCI configuration space to specify the IRQ signal to which the ISA device interrupt signal needs to be connected. Using one of the above methods, the system can determine if the card is a migrated ISA card and also determine to which IRQx signal the card's INTx pin needs to be connected. The system uses the interrupt switch array to connect the migrated ISA interrupt to the required IRQx interrupt controller signal.

In FIG. 1, a prior art ISA-PCI interrupt system is illustrated. As shown a CPU 101 is connected to a host system bus 103. The bus 103 is also connected to a memory controller 105 which, in turn is connected to a system memory 107. The bus is also connected to other typical system interface connections including network connections and input/output interface devices and sub-systems. The system bus 103 is also shown connected to one or more PCI Host Bridge devices 109, 111 for coupling the host system bus to a PCI bus 113. The PCI bus 113 is arranged to have PCI compatible devices connected to PCI slots 115 and 117. Also connected to the PCI bus 113 is a PCI-ISA bridge circuit 119 coupled to an ISA bus 120. The ISA bus 120 is arranged to have a plurality of ISA devices connected thereto such as ISA#1 device 121, ISA#2 device 123 and ISA#3 device 125.

Figure 2:
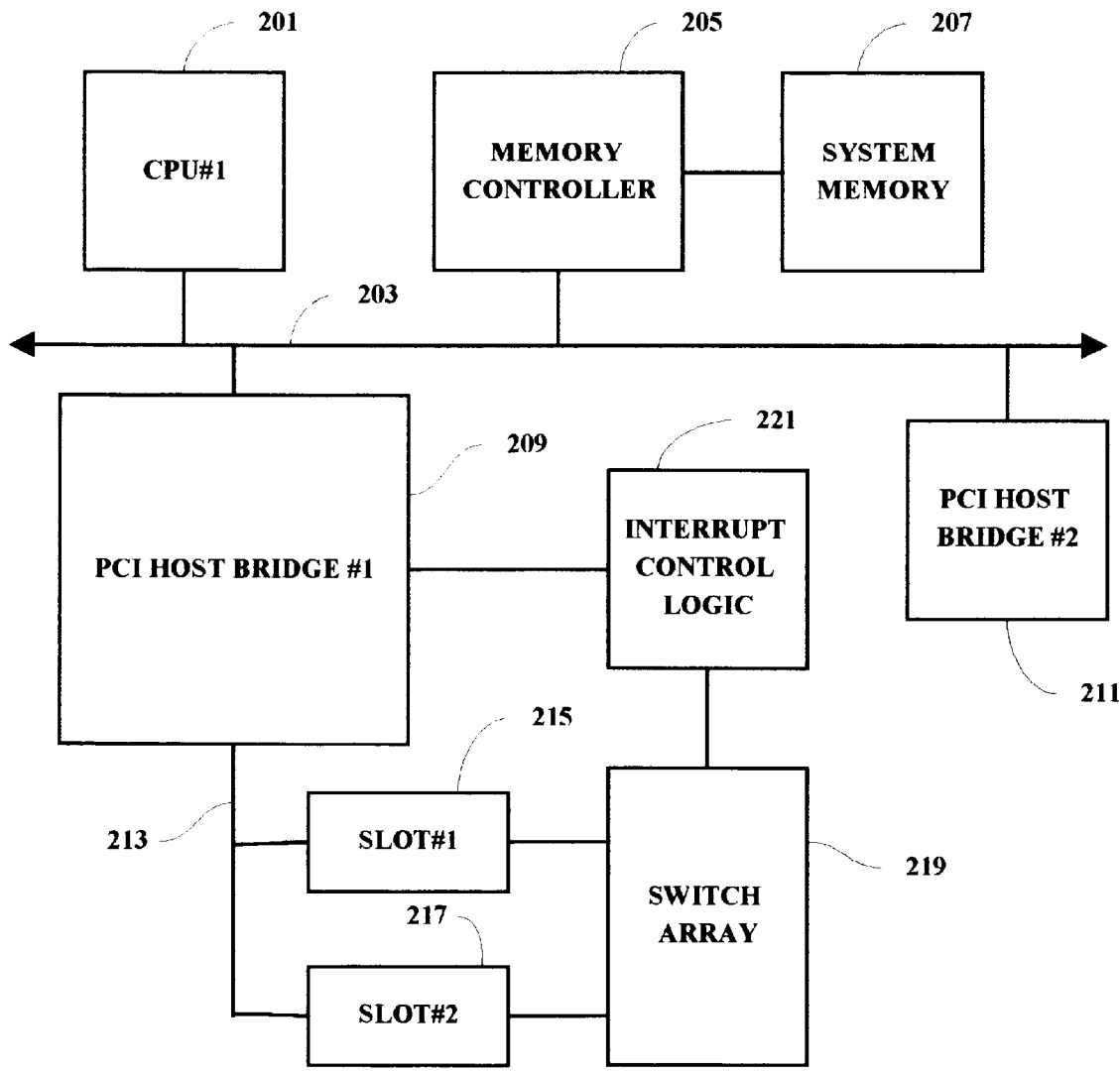
FIG. 2 is a schematic block diagram illustrating a PCI system including an exemplary switching array and interrupt control logic.

In FIG. 2, a switching arrangement is illustrated to enable ISA interrupts to be serviced in a PCI system without requiring a separate PCI-ISA bridge circuit. As illustrated in FIG. 2, a CPU 201 is connected to a host system bus 203 which is also connected to a memory controller 205 and associated system memory 207. The bus is connected to a PCI-host bridge #1 209 and may also be connected to additional host bridge circuits such as PCI host bridge #2 211. PCI host bridge 209 is connected to a PCI bus 213 which is arranged to have PCI devices connected thereto through PCI slots including, for example, a first PCI slot 215 and a second PCI slot 217. As shown, PCI slots 215 and 217 are connected to a switch array 219 which is in turn connected through an interrupt control logic circuit 221 to the PCI host bridge circuit 209.

Figure 3:
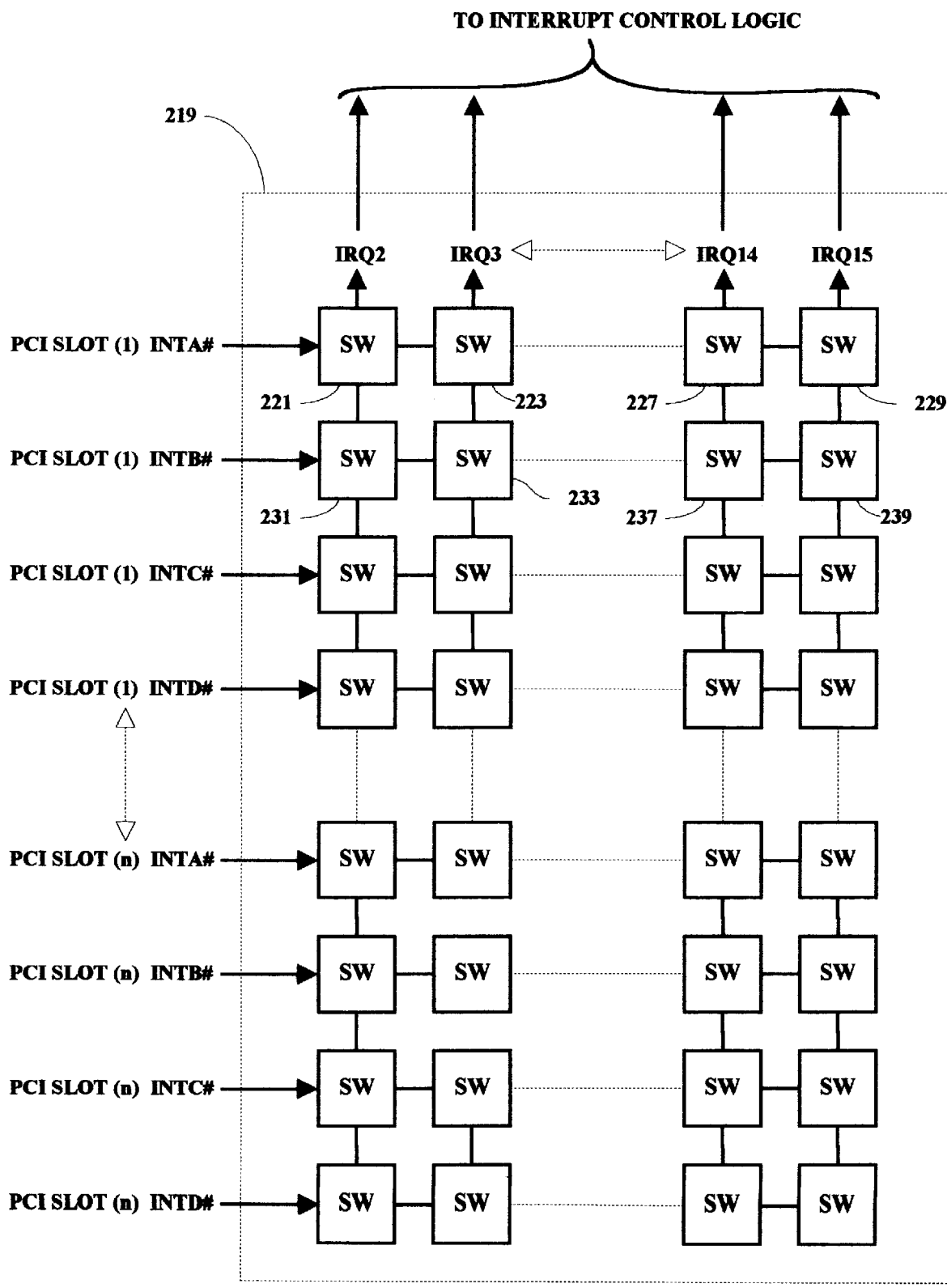
FIG. 3 is a schematic diagram illustrating a detailed example of the switching array of FIG. 2.

FIG. 3 shows the details of the switch array circuit 219. As illustrated, each PCI slot, such as PCI slot#1, includes four PCI interrupt lines, such as lines "PCI Slot (1) INTA#"–"PCI Slot (1) INTD#", connected thereto which are arranged to receive interrupt signals and apply those signals to the switch array 219. When a migrated or modified ISA device is inserted into a PCI slot, the migrated ISA device interrupt line from the migrated ISA device will be applied to one of the PCI slot interrupt lines. Each PCI interrupt line is connected to a series of switching devices with each switching device corresponding to one of the standard ISA interrupt signals or ISA system interrupt lines, including, IRQ2, IRQ3 and so on through IRQ14 and IRQ15 which are illustrated. For example, PCI INTA# is coupled to switch 221 which provides output IRQ2, to switch 223 which provides output IRQ3, and so on through further switches (not shown) to switch 227 which provides output IRQ14 and to switch 229 which provides output IRQ15. Similarly, the INTB# signal is also applied from the PCI slot (1) 215 to another series of switches including switches 231, 233, 237 and 239 which are also connected to outputs IRQ2, IRQ3, IRQ14 and IRQ15, respectively. In a similar fashion each PCI slot interrupt line is coupled to a series of switches which are effective to provide outputs representative of and corresponding to ISA designated interrupt signals from ISA devices which may be installed in the various slots on the PCI bus 213. The switch array 219 may be controlled from circuitry within the PCI Host Bridge 209.

Figure 4:
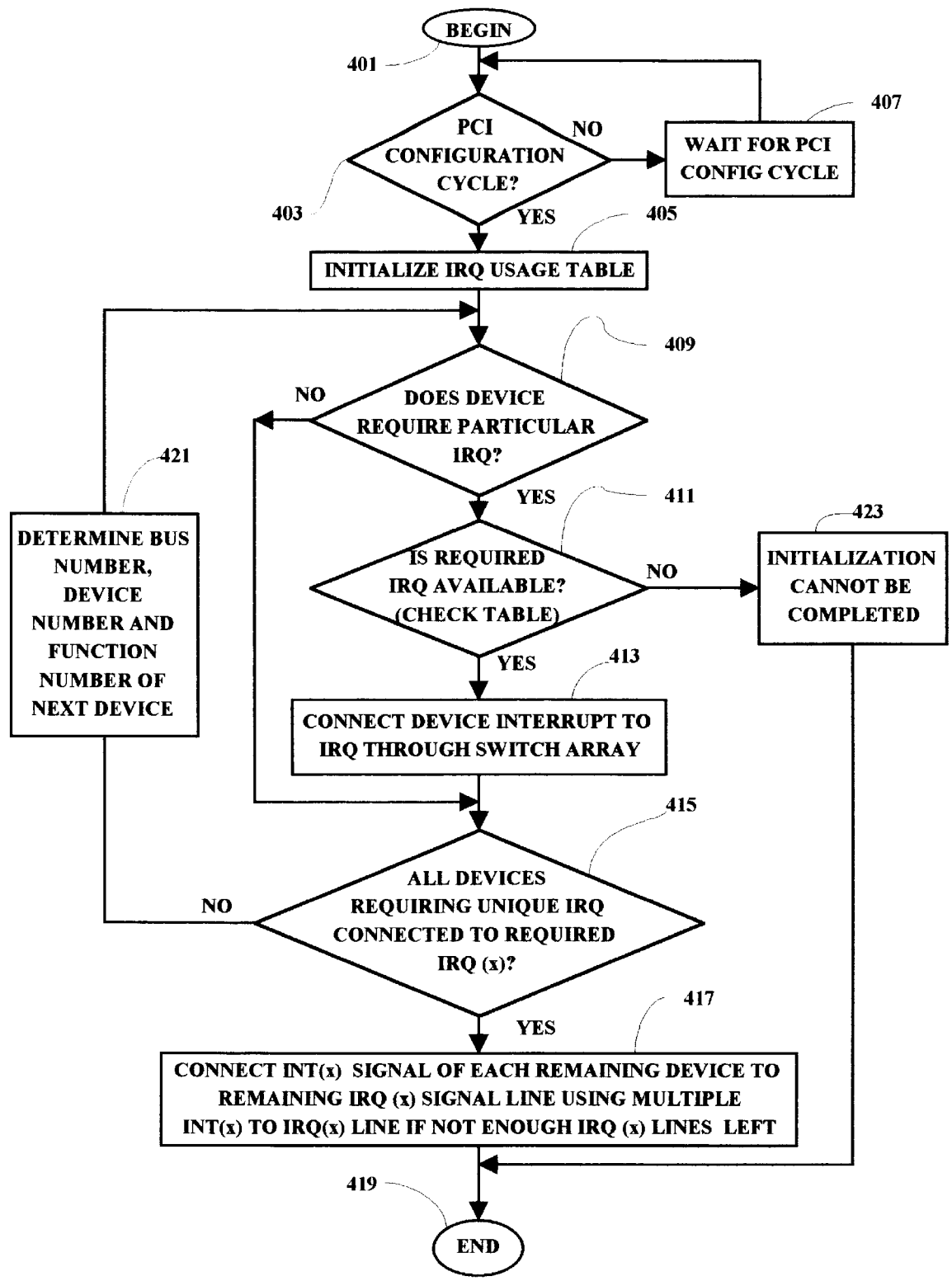
FIG. 4 is a flow chart of an exemplary methodology used to initialize devices that require the use of a particular interrupt level for software compatibility.

In operation, FIG. 4 shows a flow chart of the process used to initialize devices that require use of a particular interrupt level (IRQ) for software compatibility. The process needs to be executed during the PCI configuration process (assigning addresses, latency timer value, cache line size and interrupt line information). As the process begins 401 a determination 403, 407 is made to insure that the PCI configuration cycle has been initiated. Next, an IRQ usage table is initiated 405. It is assumed in the example that all IRQs are unused initially. A determination is then made 409 as to whether or not a device in one of the PCI slots is an ISA device requiring a particular ISA interrupt line such as one of lines IRQ2–IRQ15 which are output from the switching array 219. If so, it is determined 411 whether or not the particular ISA IRQ number is available and unused. In the example, this is done by checking a table of used and available IRQ numbers. If the required IRQ number is available, then the device interrupt is connected 413 to the required IRQ through the switch array 219. Next, a check is made to determine if all devices requiring a unique IRQ are connected to the required IRQ 415 and if so, the interrupt INT(x) for each remaining PCI slot is connected to the remaining IRQ signal lines using multiple PCI INT(x) lines connected to the ISA IRQ(x) lines if there are not enough ISA IRQ lines left unconnected to ISA devices. The process is then ended 419. Each time a device interrupt is connected 413 to an IRQ through the switch array 219, the process re-cycles by determining bus number, device number and function number of the next device 421 and then determining again if the device requires a particular IRQ 409. If a device does not require a particular IRQ, the process goes directly to again determine if there are any more devices requiring a unique IRQ connection 415. Also, if a required IRQ is not available 411, then the initialization cannot be completed 423 and the process is ended 419. Once this process is executed during system configuration/initialization, the switches remain connected to translate connected ISA devices in the PCI slots to the appropriate ISA IRQ signals in to the interrupt control logic 221 until the system is reconfigured and/or run through the initialization process again.

The method and apparatus of the present invention has been described in connection with a preferred embodiment as disclosed herein. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for use in a computer system for processing a coupling of ISA device interrupt lines from a migrated ISA device to a corresponding ISA system interrupt line, said migrated ISA device being arranged for connection through PCI interrupt lines to a PCI bus in said computer system, said method comprising:

determining that said ISA device interrupt line is required to be connected to a particular ISA system interrupt line; and connecting said ISA device interrupt line to said particular ISA system interrupt line, wherein said connecting is accomplished through a switching array, said switching array being arranged to selectively couple said ISA device interrupt lines to said ISA system interrupt lines through a connection path separate from said PCI bus.

2. The method as set forth in claim 1 wherein said determining is accomplished by accessing a vital product data keyword associated with said migrated ISA device.

3. The method as set forth in claim 1 wherein said determining is accomplished by accessing a specific device class code associated with said migrated ISA device.

4. The method as set forth in claim 1 wherein said determining is accomplished by:

defining a header type; and accessing an interrupt line field in PCI configuration space to specify the ISA system interrupt line to which said ISA device interrupt line is to be connected.

5. The method as set forth in claim 1 and further including:

determining that said particular system interrupt line is not available; and terminating said processing when said particular system interrupt line is not available for connection.

6. The method as set forth in claim 1 wherein a plurality of migrated ISA devices are arranged for connection to said PCI bus, said steps of determining and connecting being accomplished for each of said plurality of migrated ISA devices.

7. The method as set forth in claim 6 and further including:

determining which of said PCI interrupt lines is connected to said ISA device interrupt line by accessing an interrupt pin field within PCI configuration memory space.

8. The method as set forth in claim 1 wherein if no particular ISA system interrupt line is determined to be required, connecting said ISA device interrupt line to any of said ISA system interrupt lines.

9. The method as set forth in claim 1 and further including:

establishing an interrupt usage table for providing information regarding which of said ISA system interrupt lines are available to be connected to said ISA device interrupt lines; and referring to said table prior to said connecting.

10. The method as set forth in claim 1 and further including:

accomplishing said coupling of said ISA device interrupt line to said ISA system interrupt line during a configuration cycle of said computer system.

11. The method as set forth in claim 1 wherein said migrated ISA device is hard-wired to said PCI bus.

12. The method as set forth in claim 1 wherein said migrated ISA device is selectively coupled to said PCI bus by selective engagement with a PCI slot, said PCI slot being connected to said PCI bus.

13. An information processing system comprising:

a PCI host bridge circuit connected to a host bus;

a PCI bus connected to said PCI host bridge circuit;

a plurality of PCI slots coupled to said PCI bus, said PCI slots being arranged for selectively being connected to migrated ISA devices through PCI interrupt lines;

interrupt control logic means connected to said PCI host bridge circuit, said interrupt control logic means including ISA system interrupt lines arranged for receiving ISA interrupt signals for further processing within said information processing system; and a switching array connected between said plurality of PCI slots and said interrupt control logic means, said switching array being selectively operable for connecting ISA interrupt lines from said migrated ISA devices through said PCI interrupt lines to appropriate ones of said ISA system interrupt lines in said interrupt control logic means.

14. The system as set forth in claim 13 wherein said switching array is controlled by circuitry within said host bridge circuit.

15. The system as set forth in claim 13 and further including means for storing information representative of which lines of said ISA system interrupt lines are appropriate for connection to corresponding ones of said migrated ISA device interrupt lines.

16. The system as set forth in claim 15 wherein said means for storing is comprised of information stored in a memory table.

17. The system as set forth in claim 15 and further including means for determining that a particular one of said migrated ISA device interrupt lines is required to be connected to a particular one of said ISA system interrupt lines, said switching array being selectively operable for connecting said particular one of said ISA device interrupt lines to said particular one of said ISA system interrupt lines.

* * * * *